Sept. 19, 1933.  M. H. BALLARD  1,927,060
ROLLER CLUTCH
Filed April 1, 1932  2 Sheets-Sheet 1

Sept. 19, 1933.   M. H. BALLARD   1,927,060
ROLLER CLUTCH
Filed April 1, 1932   2 Sheets-Sheet 2

INVENTOR
Milton H. Ballard
By his attorney
Victor Colt

Patented Sept. 19, 1933

1,927,060

UNITED STATES PATENT OFFICE 1,927,060

ROLLER CLUTCH

Milton H. Ballard, Beverly, Mass., assignor to United Shoe Machinery Corporation, Paterson, N. J., a corporation of New Jersey Application April 1, 1932. Serial No. 602,469

13 Claims. (Cl. 192—27)

This invention relates to roller clutches and is herein illustrated as embodied in a roller clutch of the well-known "Horton" type.

In clutches of this type the wear is uniformly distributed over both the roll engaging surface of the driving member of the clutch and the surface of each roller, because the rollers may happen to become engaged with the driving clutch member when this member is in any position and the rollers may also happen to become engaged when they, themselves, are in any rotated position, as engagement and disengagement causes them to turn about their axes to a certain extent, thus bringing different surfaces into operative position. On the other hand, however, the wear on the driven member is localized. This is because the cage carrying the rollers revolves with the driven member and the slight relative movement between the driven member and the roller cage, for the purpose of engaging and disengaging the rollers, always causes each roller to engage the driven member at the same definite point. After a time, wear at these points causes grooves to be formed in the driven member. These several grooves seriously interfere with the operation of the clutch so that it is necessary then to replace the entire driven member. In many instances this requires a disassembling operation of considerable extent.

It is an object of the present invention to improve clutches of the above type so that, as a given portion of the driven member becomes worn and a groove has been formed therein, that portion may be adjusted, independently of the remainder of the driven member, to bring successively new portions, as needed, into operating position, and, at the same time, to carry the worn portions into a position where the grooves will not interefere with the subsequent action of the clutch.

Another object of the invention is to provide a clutch of this type, having adjustable portions in the roll engaging surface of the driven member, with conveniently operated means for adjusting said portions so that each will take its proper proportion of the load, thus distributing the wear equally among the several portions and so that the wear may be made to occur at corresponding positions in all of the individual portions. In this manner, as the adjustments for wear are made, each portion will be capable of being adjusted the same number of times as the others, thus allowing maximum use to be obtained from each portion.

A further object of the invention is to provide a shape and position for the adjustable wearing surfaces of the driven clutch member such that the "bite" or wedge angle that the rollers make with the driving and driven members remains substantially constant in all adjusted positions of the surfaces, and which, at the same time, will be convenient to manufacture.

It is a still further object to provide a construction in which, after the wearing portions of the driven member have been adjusted as many times as possible, these portions may be conveniently removed and replaced by new ones.

In accordance with the above objects, a feature of the invention consists in the provision of one or more members, each having a roll engaging surface, and means for adjusting the same to bring each said surface into roll engaging position. Preferably, and as illustrated, separate adjustable blocks are provided which are inserted in the driven member, one surface of each block serving as a portion of the roll engaging surface of said member. These blocks are arranged to be adjusted radially or toward and from the driving member of the clutch to bring the roll engaging surface of each into proper roll engaging position in order that each will assume its proper proportion of the load.

Another feature of the invention consists in an organization whereby, after a groove has been worn in a block, and the block has been readjusted, the worn portion can no longer be engaged by the roller and consequently will not interfere with the correct operation of the clutch. Preferably, and as illustrated, each worn surface is moved toward the driving member of the clutch to carry it beyond the possible reach of its roller.

Another feature of the invention consists in a roll engaging surface on each block which is shaped as a portion of a cylinder and which is eccentrically positioned in the clutch so that the wedge angle that the rollers make with the roll engaging surfaces of the driven and driving members remains substantially constant throughout the entire range of adjustment. The fact that the roll engaging surface is cylindrical permits the parts to be manufactured easily and the above-described positioning of the block causes the rollers to operate correctly with any adjustment of the blocks.

A further feature consists in novel and easily operated means for adjusting the blocks. In the preferred construction, this consists in arranging the blocks on inclined planes so that they operate as wedges and in providing novel adjusting screws for moving the blocks longitudinally. Longitudinal movement of each block moves it both radially and axially, the radial component of movement providing the desired adjustment while the axial component of movement of the block along the inclined plane, together with the adjusting screw, forms a means to provide a micrometric adjustment of the block.

Another feature of the invention consists, in a clutch having adjustable blocks, of means for maintaining the blocks in adjusted position. In the illustrated construction, this is accomplished by providing suitable locking means or latch mechanism for the above-mentioned adjusting screws. For this purpose these screws are provided with notched heads into which locking members are pressed by means of springs, the angles of the notches being such as not to interfere when the screw is adjusted but such that inadvertent movement of the screws is prevented. In order to reduce the cost of manufacture, two locking members are positioned in a single straight bore with a spring between them so that a single means is provided for acting upon a plurality of locking members to maintain them in locking position. Preferably, an additional locking means is provided to hold the wedge blocks in position after adjustment and especially to prevent their movement toward a tighter adjusted position.

A further feature consists in an organization whereby, after the blocks have been adjusted along their inclined planes as many times as possible and have become worn so that they can no longer be used, they may be removed from the clutch by movement in the opposite axial direction and replaced by new blocks, without disassembling the clutch or removing it from the machine in which it is incorporated.

Other objects and features of the invention will be best understood and appreciated from an inspection of the drawings when considered in connection with the following description.

Figure 2:
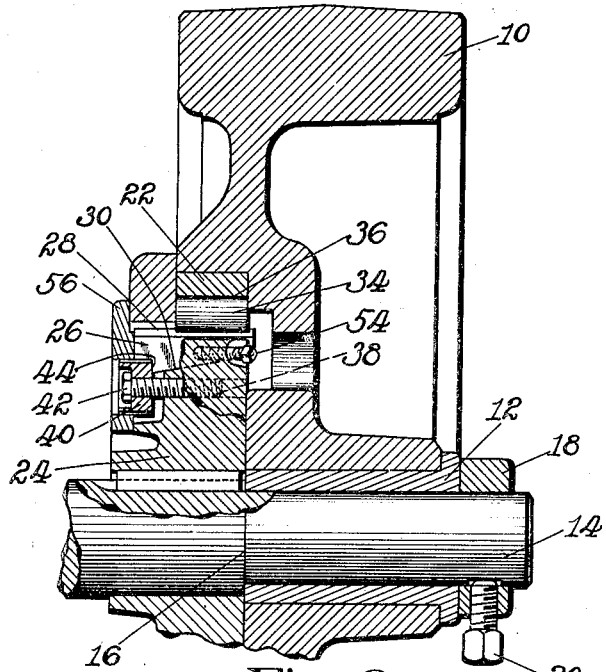
Fig. 2 is a cross section taken along the lines II—II of Fig. 1, looking in the direction of the arrows.

10 indicates the driving pulley of a machine in which a Hortion clutch is embodied. This driving pulley is provided with a bushing 12 which is mounted to turn freely on the driven shaft 14 of the machine. The bushing and, accordingly, the driving pulley are retained longitudinally of the shaft by means of a shoulder 16 on the driven shaft 14 and a collar 18 secured to the shaft by a set screw 20. The driving pulley 10 is recessed and a hardened ring 22 is inserted and secured in the recess to serve as the driving member of the clutch. Keyed to the driven shaft 14 is a collar-like member 24 which serves as the driven member of the clutch. Recesses or slots are provided in the driven member into which are inserted adjustable wearing blocks 26. These blocks are substantially wedge-shaped and each has a curved roll engaging surface 28 and an inclined flat surface 30 which latter rests upon a correspondingly flat inclined surface on the driven member 24. The adjustable blocks 26 are retained laterally by the sides 32 of the slots. The usual rollers of the Horton clutch are indicated by the numeral 34. In order to position the adjustable wedges 26 to secure proper gripping or biting action between the roll engaging surface 28 of the wedges and the roll engaging surface 36 of the ring 22, micrometric adjusting means is provided. For this purpose the driven member 24 is tapped for adjusting screws 38. These screws are provided with thick collars 40 secured thereto by any suitable means such as by a pin, a key, or by welding. The adjusting screws are provided with heads 42 which may be conveniently engaged by a bent socket wrench which can be operated in the space between the pulley 10 and the adjacent parts of the machine. It will be seen that, by adjusting the screws 38, the collars 40, by engagement each with a notch 44 in its wedge block, move the wedges inwardly towards the driving pulley (towards the right in Fig. 2). Each wedge is thus carried in an axial direction, and by means of the inclined surface 30, also in a radial direction, to reduce the distance between its roll engaging surface 28 and the roll engaging surface 36 of the driving member. In order to maintain the adjusted position of the wedges 26, the collars 40 are provided with numerous notches 46 into which are pressed locking members 48 having ends corresponding in shape to the shape of the notches 46. Two locking members 48 are mounted in a single bore 50, and a spring 52 is positioned in the bore between the two locking members to press each locking member outwardly into engagement with a notch 46 of the collar with which it cooperates. The notches are so shaped that the collars 40 will turn when a socket wrench is applied to the head 42 of its adjusting screw 38, but the angle is sufficient to prevent accidental turning of the collars and thus the screws 38 are locked in position, so that the wedges are maintained in adjusted position. In order further to maintain the wedges in adjusted position, and to prevent them from movement away from the collars 40, set screws 54 are provided to clamp the wedges against the sides of the slots. A cover plate 56 is mounted, by means of screws 58, on the driven member 24 to prevent dirt from collecting upon the roll engaging surfaces 28 of the wedges. The cover 56 is provided with openings so that the heads 42 of the screws 38 may be readily accessible for adjustment.

Figure 1:
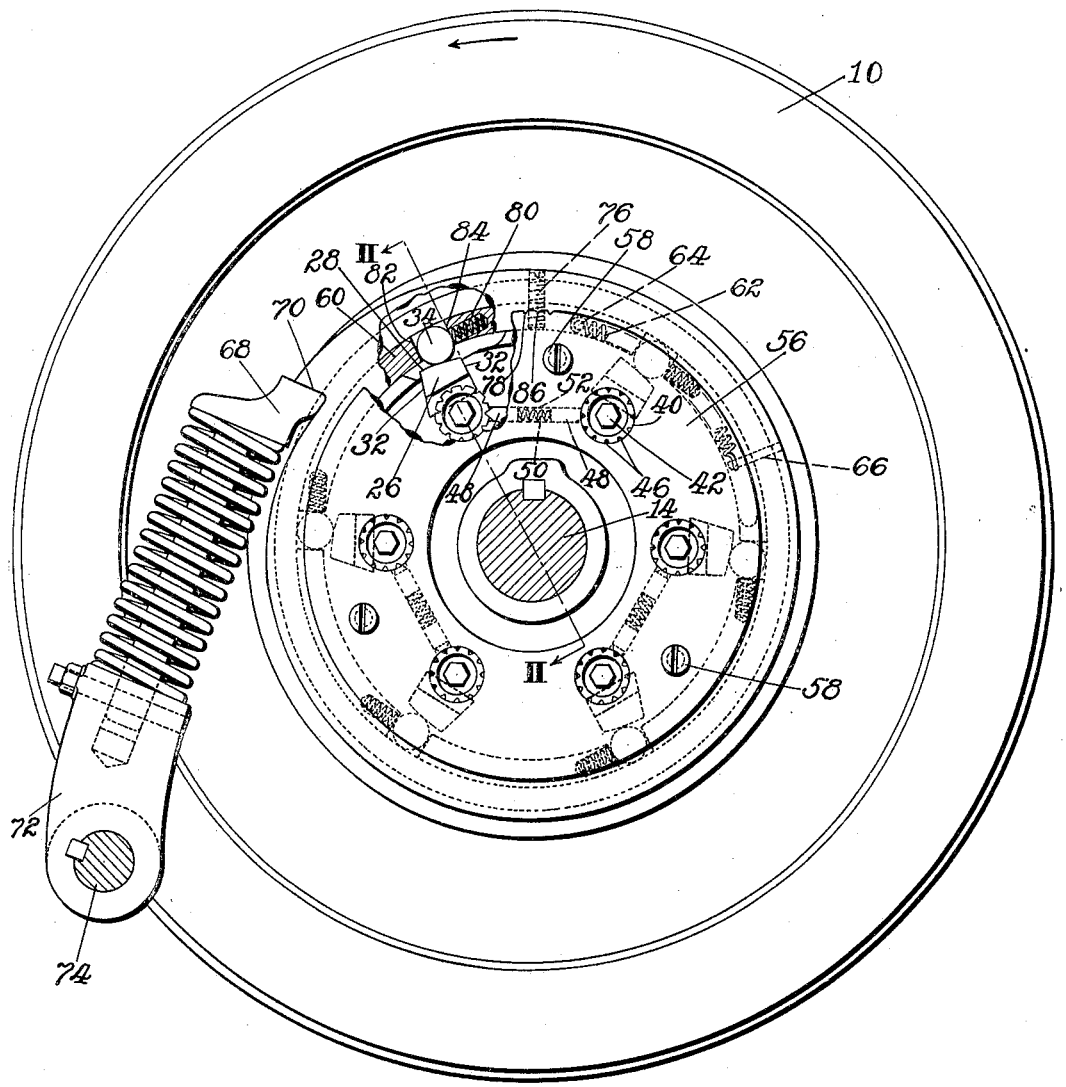
Fig. 1 is an end view of a Horton clutch in which the present invention is incorporated, certain portions being broken away to shown details of construction.

The rollers 34 are carried in a cage 60 which is of the usual construction and is provided with a spring 62 for moving it slightly in the direction of rotation of the driving member when it is desired to engage the clutch. The spring 62 is connected in the usual manner, one end being attached to a pin 64 fastened in the driven member and the other end being attached to a pin 66 secured to the roller cage. This cage is controlled in the usual manner by a stop member 68 which is yieldingly mounted on a swinging member 72 carried by a rock shaft 74, movement of which, in a counterclockwise direction as viewed in Fig. 1, releases the stop member 68 from a shoulder 70 on the roller cage 60. This allows the cage, moved by the spring 62, to carry the rollers into clutch engaging position to start the shaft 14.

It is desirable to have the wedge blocks wear as long as possible before renewal and to have them all wear equally. The clutch is accordingly constructed so that the points of contact of the rollers with the wedge blocks may be progressively adjusted from the thick portion of the blocks to the thin portion as wear occurs and so that similar corresponding adjustments may be made on each of the wedges.

The above-desired adjustment is made in the following manner, after the driving belt has been removed from the pulley 10 and the stop 68 has been disengaged from the shoulder 70. With the screws 38 and wedge blocks 26 backed out, the roller cage 60 is first temporarily locked to the driven member 24 by a set screw 76 with the set screw directly opposite an indicating notch 78 on the plate 56. The roller springs 80 press the rollers 34 against the opposite faces 82 of the slots of the roller cage. The adjusting screws 38 are then turned by a bent socket wrench engaging the head 42 so that the wedge blocks 26 are each moved inwardly until each of the rollers is engaged equally between the surface 28 of its wedge blocks and the inside surface 36 of the driving member. After the above adjustments have been made, the temporary locking screw 76 is released from the driven member and the belt is applied. When the stop 68 is released from the shoulder 70, the spring 62 carries the roller cage forward and the springs 80 carry the rollers forward, all of the rollers engaging at the same time, and with equal force in the manner of an unworn Horton clutch. After the rollers are engaged, the spring 62 being stronger than the total of the springs 80, the surfaces 82 are freed from the rollers so as not to interfere with their action. The cage is prevented from moving further in the forward direction, after clearance has been taken up, by the opposite surfaces 84 on the slots in the roller cage coming in contact with the locked rollers in the usual manner.

After the clutch has been used sufficiently to wear grooves in the wedge blocks 26, the adjustment of the blocks is repeated as before with the next notch 86 opposite the set screw. These notches 78, 86 are sufficient in number and spaced a suitable distance apart so that the rollers 34 will wear as many grooves as possible in the wedge blocks before it is necessary to replace them. It should be noted that, after each adjustment is made, the previously worn groove is on a high or thick portion of the wedge block and is moved nearer to the driving member where it cannot be engaged by the rollers 34 and, therefore, these worn portions do not interfere with the subsequent operation of the re-adjusted clutch.

The manner in which the curvature of the cylindrical wearing surface 28 of each wedge block 26 is determined is illustrated diagrammatically on an enlarged scale in Fig. 3, and, as even this enlarged scale is too small to show clearly the exact centers about which certain radii are drawn, the line H (hereinafter described) is shown on a still larger scale in Fig. 4, with these centers clearly indicated thereon.

Figure 3:
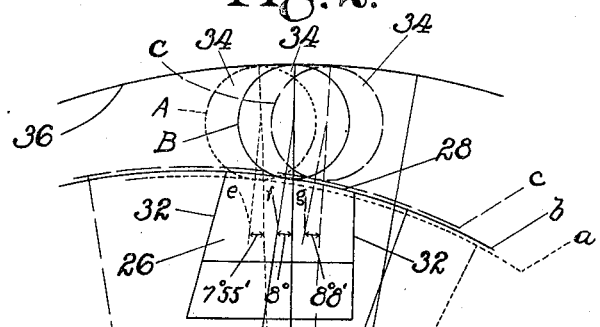
Fig. 3 is a diagrammatic representation, on an enlarged scale, to illustrate the manner in which the roll engaging surface of the driven member is formed.
Figure 4:
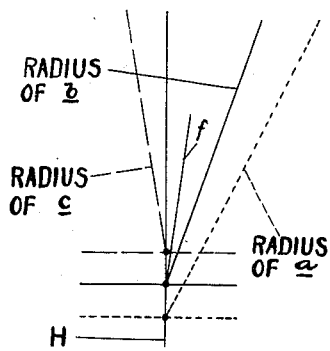
Fig. 4 is a diagram, on a larger scale than Fig. 3, showing the relative locations of the centers about which certain arcs therein have been drawn.

In Fig. 3 the arc 36 represents the roll engaging surface 36 of the driving member. A wedge block 26 is shown, in full lines, in mid-position, i. e., in the position that one of them will take when it is one-half worn out and with a roll engaging surface 28, coinciding with an arc $b$, determined in a manner hereinafter described. A clutch roller 34 is shown also in full line position, indicated by B, in clutch engaging position, or tangent to both the surfaces 28 and 36. F represents that radius of the arc 36 that passes through the point on the arc at which B is tangent. F also necessarily passes through the center of the roller in the position B.

Let it be assumed that the desired angle of "bite" of a roller between the roll engaging surfaces 28 and 36 is 8 degrees, a value found to be desirable in most clutches of the "Horton" type. A line $f$ is then drawn through the center of the roller B at the desired angle (8 degrees) with the line F. Any arc drawn tangent to B with its center on the line $f$ will represent the cylindrical surface of the wedge block and will provide an angle of "bite" of the rollers of the desired amount (8 degrees in the illustrated construction) when the roller 34 is in the mid-position B. This is because, according to the principles of geometry, the angle between the tangents at the points of contact is equal to the angle between $f$ and F.

In order to obtain, in the several adjusted positions of the wedge block 26, an angle of "bite" as near as possible to the desired angle, the extreme positions A and C of the roller 34 are drawn tangent to the arc 36. A radius is then found by trial which, after it is used to draw the arc $b$ tangent to B, with its center on the line $f$, can be used to draw the other arcs $a$ and $c$, tangent to A and C respectively, by positioning the center of the arc on a line H, passing through the center used for $b$ and parallel to the radius F, the center for $a$ being below, and for $c$ above, said center for $b$ on the line H. (See Fig. 4.) The arcs $a$ and $c$ represent the extreme adjusted positions of the wearing surface 28 of the wedge block 26 and $b$ represents the mid-position of said block. (This movement of the center in a line parallel with the radius F corresponds to the radial adjustment which is given to the wedge block 26 as wear is taken up.) The preferred radius, after a number of trials, will be found when the angles between $e$—E and $g$—G differ as little as possible from the desired 8 degrees or other chosen value. ($e$ and $g$ are radii of the roller 34 in the positions A and C, respectively, which radii pass through the points of tangency of A and C with said arcs $a$ and $c$. These radii correspond, therefore, to the radius $f$ which passes through the point of tangency with the arc $b$ when the roller is in the position B. E and G are radii of the arc 36 which radii pass through the points of tangency of A and C with said arc and so correspond to the radius F at the point of tangency of B.)

In the illustrated example, the angles have been found to be 7 degrees 55 minutes between $e$—E and 8 degrees 8 minutes between $g$—G. Such small deviations as 5 minutes and 8 minutes, respectively, are imperceptible in the practical use of the clutch.

It will be understood that the several arcs $a$, $b$ and $c$ represent a portion of the surface of a cylinder in different positions and it will be seen that, by forming the roll engaging surface of each block as a portion of a cylinder, the blocks may be manufactured conveniently, because a number of them may be located and clamped in a holder and all ground at one time about a center until the individual surfaces all coincide with the surface of a cylinder having the desired radius.

Having thus described my invention, what I claim as new and desire to secure by Letters Patent of the United States is:—

1. A roller clutch having, in combination, a plurality of blocks each having a roll engaging surface, and means for adjusting the blocks radially to bring each said surface into proper roll engaging position.

2. A roller clutch having, in combination, a driven member, a driving member, a plurality of blocks each having a cylindrical roll engaging surface, and means for adjusting each block toward and away from the driving member of the clutch to bring each said surface into proper roll engaging position.

3. A roller clutch having, in combination, a driven member, a driving member, a plurality of blocks, each having a roll engaging surface, and means for adjusting each block toward the driving member of the clutch to carry a worn portion thereof out of roll engaging position and to bring a new portion into such position.

4. A roller clutch having, in combination, a plurality of blocks, each having a roll engaging surface, means for adjusting each block toward and away from the axis of the clutch to bring each said surface into proper roll engaging position, and means for maintaining the blocks in adjusted position.

5. A roller clutch having, in combination, a plurality of wedge blocks, each having a cylindrical roll engaging surface, and means for adjusting each wedge block both axially and radially to bring a new portion of each said surface into proper roll engaging position when wear occurs.

6. A roller clutch having, in combination, a plurality of wedge blocks, each having a roll engaging surface, means for adjusting each wedge block both axially and radially to bring a new portion of each said surface into proper roll engaging position when wear occurs, and means for maintaining the blocks in adjusted position.

7. A roller clutch having, in combination, a plurality of adjustable wedge blocks having roll engaging surfaces, screws for adjusting the blocks to locate said surfaces in proper roll engaging positions, and a latch mechanism to lock the screws in adjusted position.

8. A roller clutch having, in combination, a plurality of adjustable wedge blocks having roll engaging surfaces, screws for adjusting the blocks to locate said surfaces in proper roll engaging positions, notches in the heads of said screws, and spring-pressed members to engage said notches and lock the screws in adjusted position.

9. A roller clutch having, in combination, a plurality of adjustable wedge blocks having roll engaging surfaces, screws for adjusting the blocks to locate said surfaces in proper roll engaging positions, notches in the heads of said screws, members to engage said notches and lock the screws in adjusted position, and means, each acting on a plurality of said members, to maintain them in locking position.

10. A roller clutch having, in combination, a plurality of adjustable wedge blocks having roll engaging surfaces, screws for adjusting the blocks to locate said surfaces in proper roll engaging positions, notches in the heads of said screws, spring-pressed members to engage said notches and lock the screws in adjusted position, and additional means for locking said blocks in position and for maintaining them in contact with the heads of said screws.

11. A roller clutch having, in combination, a shaft, a roller cage, rollers mounted in the cage, and a plurality of members having gripping surfaces to cooperate with the rollers, the gripping surface of one of said members being concentric with the shaft, and the gripping surfaces of the other members being eccentric to the shaft, said latter members being adjustable to bring new portions of the surfaces into engagement when wear occurs.

12. A roller clutch having, in combination, driving and driven members, a shaft, one of said members having a roll engaging surface concentric with the shaft, a plurality of adjustable blocks mounted in the other of said members, each of said blocks having a roll engaging surface constructed and arranged so that the wedge angle at the point of contact remains substantially unchanged as the block is adjusted to take up wear.

13. A roller clutch having, in combination, a plurality of wedge blocks, each having a roll engaging surface, a driven clutch member, inclined supporting surfaces on said clutch member for supporting the blocks, and means for moving each block axially in one direction on one of said supporting surfaces so that its roll engaging surface may be brought into proper roll engaging position, all being so constructed and arranged that the blocks may be moved in the opposite axial direction and be removed from the clutch and new ones substituted without disassembling the clutch or the machine in which it may be incorporated.

MILTON H. BALLARD.